United States Patent [19]
Glasson et al.
[11] 4,156,238
[45] May 22, 1979

[54] DISPLAY APPARATUS HAVING VARIABLE TEXT ROW FORMATING

[75] Inventors: Jerry M. Glasson, Skokie; Dennis W. Gruber, Arlington Heights, both of Ill.

[73] Assignee: Teletype Corporation, Skokie, Ill.

[21] Appl. No.: 854,923

[22] Filed: Nov. 25, 1977

[51] Int. Cl.[2] .......... G06F 3/14

[52] U.S. Cl. .......... 340/749; 340/789; 340/723

[58] Field of Search .......... 340/324 AD, 152, 154

[56] References Cited

U.S. PATENT DOCUMENTS

| | | | |
|---|---|---|---|
| 3,423,749 | 1/1969 | Newcomb | 340/324 AD |
| 3,500,470 | 3/1970 | Barker et al. | 340/324 AD |
| 3,582,946 | 6/1971 | Mita et al. | 340/324 AD |
| 3,868,673 | 2/1975 | Mau, Jr. et al. | 340/324 AD |
| 4,019,090 | 4/1977 | Wolff et al. | 340/324 AD |

*Primary Examiner*—Marshall M. Curtis
*Attorney, Agent, or Firm*—W. K. Serp; J. C. Albrecht

[57] ABSTRACT

A circuit is described for selectively increasing the number of text rows on the display screen of a CRT. The number of scan lines in each text row is reduced by one in response to a display format selection signal. The scan lines so saved are utilized to form two additional text rows. A variable modulus scan line counter is used in combination with a decoder to provide the scan line counter modulus desired. Additionally, a text row counter is used in combination with a second decoder to selectively change the modulus of the text row counter to correspond with the selected modulus of the scan line counter. A compressed display is provided by simultaneously changing the modulus of both the scan line and text row counters.

6 Claims, 1 Drawing Figure

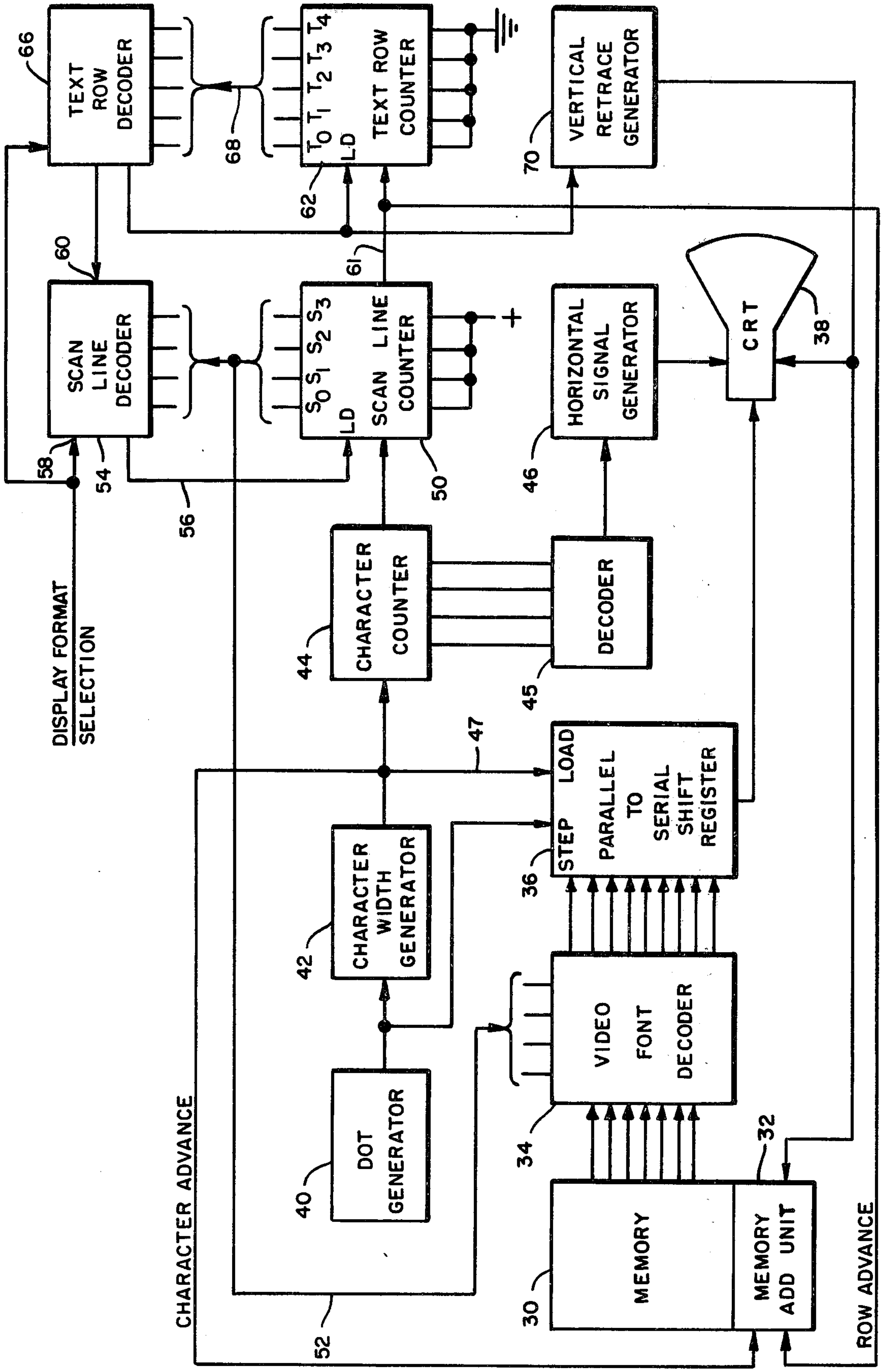
TEXT ROW DECODER
66
68
$T_0$ $T_1$ $T_2$ $T_3$ $T_4$
LD
TEXT ROW COUNTER
62
VERTICAL RETRACE GENERATOR
70
SCAN LINE DECODER
60
58
54
56
$S_0$ $S_1$ $S_2$ $S_3$
SCAN LINE COUNTER
61
50
HORIZONTAL SIGNAL GENERATOR
46
CRT
38
DISPLAY FORMAT SELECTION
CHARACTER COUNTER
44
DECODER
45
47
LOAD
STEP
PARALLEL TO SERIAL SHIFT REGISTER
36
CHARACTER WIDTH GENERATOR
42
VIDEO FONT DECODER
34
DOT GENERATOR
40
CHARACTER ADVANCE
MEMORY
30
MEMORY ADD UNIT
32
52
ROW ADVANCE

DISPLAY APPARATUS HAVING VARIABLE TEXT ROW FORMATING

BACKGROUND OF THE INVENTION

This invention generally relates to a control circuit for selectively varying the number of character text rows simultaneously displayed on the screen of a cathode ray tube.

A variety of video systems for alphanumeric character display have been suggested and implemented. One approach has been the generation of a dot matrix by means of a plurality of vertically spaced horizontal scans of a selectively blanked electron beam directed at the screen of a cathode ray tube. During scanning, the beam is pulsed to produce the desired dot pattern for generating the selected characters. A particular arrangement for producing such a matrix is described in U.S. Pat. No. 3,868,673 issued to T. J. Mau et al. on Feb. 25, 1975, entitled "Display Apparatus Including Character Enhancement." The raster produced on the cathode ray tube (CRT) display screen may conceptually be divided into several horizontal text rows each including a plurality of sequential scan lines, e.g., fourteen. Additionally, each text row may be divided into a plurality of character areas. Frequently, space is provided for sixty four or eighty characters on each text row. The cathode ray tube electron beam is pulsed during each scan to successively write a portion of each of the characters in the selected text row. Heretofore, the overall frequency relationships of the system have been selected so that each text row has the same number of scan lines and an equal number of scan lines are utilized during the vertical retrace interval. A typical arrangement utilizes twenty-four text rows consisting of fourteen scans each and an additional group of fourteen scans is utilized during vertical retrace of the CRT beam. The total number of scan lines being three hundred fifty (25×14). Such a system is described in the previously cited U.S. patent wherein the height of each character is nine scan lines with the remaining five scan lines in each text row providing spacing between contiguous text rows.

Frequently, it is desirable to provide the operator with an advisory service message without significantly disrupting the working text display. Heretofore, the presentation of such an advisory message has required switching the entire screen format from the working text to the advisory message. The illustrated embodiment provides a means for compressing the working text display so as to provide two additional text rows for the display of additional information such as an operator service message. As will be subsequently more fully appreciated, the additional text rows are obtained by reducing the number of scans per text row without reducing in the character size, that is, by reducing the spacing between contiguous character rows.

SUMMARY OF THE INVENTION

The invention relates to a wide display apparatus wherein the number of text rows displayed upon the screen of a cathode ray tube may be selectively varied. The text characters are written in rows upon the cathode ray tube display screen by scanning the screen with a controlled beam. A group of successive electron beam scans produce a character text row upon the screen. A selectable modulus scan line counter is included which has a first modulus value corresponding to the number of scan lines in a conventional character text row. The scan line counter is advanced upon the completion of each scan line and provides an output pulse upon the completion of the scan of a character text row. Means are included for changing the modulus of the scan line counter to a second value lower than the first value and corresponding to the number of scan lines in a character text row during a compressed character presentation. A selectable modulus text row counter is included having a first modulus value corresponding to the number of the text rows displayed during conventional display. The text row counter is advanced in response to the output pulse from the scan line counter and the output of the text row counter serves to control the vertical retrace of the electron beam on the cathode ray tube.

Means are included for changing the modulus of the text row counter to a second value thus providing a greater number of text rows on the display screen.

DESCRIPTION OF THE DRAWING

The single FIGURE is a block diagram of a control circuit for a CRT display including certain features of this invention.

DETAILED DESCRIPTION

Structure

With reference to the single FIGURE, the information to be displayed is stored in encoded form in a random access memory 30 which is selectively addressed by a memory address unit 32. The output of the memory 30 is a parallel multibit ASCII signal which is fed to a video font decoder 34. The font decoder 34 serves to decode each ASCII character from the memory 30 scan line by scan line. This decoded character information is fed to a parallel to serial shift register 36. The output signal of the register 36 is fed to the control grid of a cathode ray tube 38 selectively blanking the electron beam thus generating the corresponding character display. In the following discussion, certain mathematical values will be mentioned in connection with the discussion of certain of the elements illustrated. It will be appreciated that these values are provided for illustrational purposes to improve presentational clarity and may be varied without departing from the scope and spirit of the invention as claimed. Each character in a text row is written line by line by unblanking the cathode ray beam to generate selected dots in a nine by fourteen matrix as described in the aforecited Mau et al. patent. In such a dimensioned matrix, the maximum width of each character is seven dots resulting in a two dot space between horizontally adjacent characters in the same text row. Further, the maximum height of a character is nine dots or scan lines providing a space between characters in contiguous text rows of five scan lines thus completing the full fourteen scan lines for each text row. As will be subsequently more fully described, the text display is selectively compressed without substantially reducing the legibility of the displayed characters. This feature is accomplished by reducing the spacing between characters in contiguous text rows and utilizing the uncommitted scan lines to increase the number of text rows.

The overall frequency relationship of the display is established by the dot generator 40 which clocks a modulus nine character area width counter 42. The character area width counter 42 in turn drives a modulus one hundred character counter 44 which provides an output pulse at the end of each eighty character scan line with twenty of the one hundred counts accommodating the horizontal retrace of the CRT beam. Each successive character is parallel loaded from the video font decoder 34 into the shift register 36 under control of the output of the character width counter 42 via line 47. The output of the character width counter 42 is also fed to the memory address unit 32 and serves to advance the memory address through successive characters in the selected row addresses. The decoded characters are serially stepped from the shift register 36 by the output of the dot generator 40. The character area width counter 42 provides an output pulse which occurs once for each character, plus two interspacing dots. After the character counter 44 advances to a count of eighty, representing the number of character areas on each text row, the synchronous scan line counter 50 is advanced. The multilevel output of the character counter 44 is decoded by a decoder 45 the output of which triggers a horizontal retrace generator 46 which controls the horizontal deflection of the CRT beam.

The multibit output of the scan line counter 50 serves to address the video font decoder 34 via multiconductor cable 52. The state of the scan line counter 50 selects the decoding level of each of the characters in the selected text row as they are sequentially presented to the video font decoder 34 by the memory 30 once during each scan line of the selected text row. The scan line counter 50 is a synchronous presettable counter clocked by the output of the character counter 44. As will subsequently be more fully appreciated, the counter 50 has a modulus value of fourteen during normal display and, when a compressed display is selected, has a modulus value of thirteen for each character row and a value of twelve during the vertical retrace interval of the compressed display. In this manner, the same total number of scans is maintained for each complete raster during both conventional and compressed display. The scan line decoder 54 decodes the states of the scan line counter 50 and provides an output signal which is a parallel load signal via line 56 to the counter 50. The signal sets all stages of counter 50 high in response to the next following clock signal. In response to the combined direction of the signal level at the two control inputs 58 and 60, the decoder 54 responds to counter 50 states twelve, thirteen, or fourteen as will be further considered. Upon completion of each scan line, a clocking signal from the output of the scan line counter 50 is fed via line 61 to the clock input of a synchronously presettable text row counter 62. Serving to preset the text row counter 62 to zero upon the occurrence of either count twenty-five or twenty-seven is a text row decoder 66 which is addressed by the multibit output of the text row counter 62 via multiconductor cable 68. Thus, the text row counter 62 is preset to zero upon occurrence of the clocking output pulse from the scan line counter 50 which follows the decoding of counter state twenty-five for normal display and counter state twenty-seven for compressed display. The rising edge of the output of the text row decoder 66 actuates a vertical retrace generator 70. The text row counter 62, having a synchronous preset, loads with all zeros on the clock pulse immediately following the load signal from the text row decoder 66 thus allowing completion of the vertical retrace before presetting of the text row counter 62. Also, in conjunction with the vertical retrace of the electron beam, the output of the vertical retrace generator 70 directs the memory address unit 30 to address the start of the memory page for the following raster scan.

Operation

During conventional display, the display format selection signal is low and the display screen of the cathode ray tube 38 accommodates twenty-four text rows each having 80 characters and, what may be considered, a twenty-fifth row is utilized for vertical retrace of the beam across the screen. Each character row as well as the vertical retrace interval includes fourteen scan lines for a total of three hundred fifty scan lines in a full raster. During compressed display the format selection signal is high and two additional display rows are provided, i.e., twenty-six display rows with an additional twenty-seventh row of a reduced number of scan lines providing the vertical retrace interval. As previously mentioned, the additional text rows are accommodated by reducing the number of scan lines in each of the displayed text rows from fourteen to thirteen and the vertical retrace interval is reduced to twelve scan lines thus maintaining a total of three hundred fifty scan lines for a complete raster.

During display, each character in a displayed character row is sequentially presented to the font decoder 34 from the memory 30. The scan level of the text row is fed to the font decoder 34 in binary form from the scan line counter 50 and the scan line of each character in the selected row is decoded as described in the aforecited Mau, Jr. et al. U.S. Pat. No. 3,868,673. The decoded character is parallel loaded into the shift register 36 in response to a load signal from the character area width counter 42 and serially stepped from the shift register 36 in response to a stepping signal from the dot generator 40. The serial output of the shift register 36 selectively unblanks the CRT beam to produce the desired characters.

The output of the character area width counter 42 also advances the character counter 44 and the character counter state is decoded by the decoder 45 the output of which drives the horizontal generator 46. As mentioned, the generator 46 controls the horizontal deflection of the beam of the CRT 38.

The scan line counter 50 is preset to a count of fifteen in response to a load signal from the scan line decoder 54 and a clocking signal from the character counter 44. When the display format selection signal is low the decoder 54 responds to state fourteen of the counter 50. When the format signal is high the scan line decoder 54 provides a parallel load pulse to the scan line counter 50 in response to either count twelve or thirteen of the scan line counter 50 as indicated by the output level of the text row decoder 66 present at input 60 of the scan line decoder 54. During the writing of the character text rows on the CRT 38, the scan line decoder 54 decodes count thirteen and during vertical retrace, which corresponds to text row counter 62 state twenty-six, the scan line decoder 60 responds to count twelve of the scan line counter 50. Although during compressed display the number of scan lines in each text row decreases, the height of displayed characters is retained with the deleted scan lines obtained by reducing the spacing between contiguous character rows.

The output signal on line 61 from the scan line counter 50 advances the text row counter 62 and the memory address unit 32 to the address of the next text row. The multibit output of the text row counter 62 is decoded by the text row decoder 66 and, during conventional formating, a vertical retrace signal is generated upon completion of the twenty-four displayed text rows. The text row counter 62, being synchronous, is preset, after the decoded text row is written, in response to the next output signal via line 61 from the scan line counter 50. In response to the display format selection signal going high, the scan line decoder 54 responds to the start of count twenty-six of row counter 62 as decoded by the text row decoder 66. This reduces the number of scan lines during vertical retrace of the CRT 38 beam to twelve maintaining a full raster of three hundred fifty lines.

A circuit has been described for selectively varying the number of text lines displayed on the screen of a cathode ray tube so as to provide a conventional as well as compressed display. Although this invention has been shown and described with reference to a preferred embodiment thereof, it will be understood that various changes in form and detail may be made without departing from the spirit and scope of the invention.

What is claimed is:

1. A video display apparatus wherein the number of text rows displayed upon the screen of a cathode ray tube (CRT) may be selectively varied and wherein text characters are written in rows by successively scanning the CRT screen with a controlled electron beam, a group of said successive electron beam scans producing a character text row upon the screen comprising:

a selectable modulus scan line counter having a first modulus value corresponding to the number of scan lines in a conventional character text row, said scan line counter being advanced upon the completion of each scan line and providing an output pulse upon the completion of the scan of a character test row, means for changing the modulus of said scan line counter to a second value lower than said first modulus value and corresponding to the number of scan lines in a character text row during a compressed character presentation, a selectable modulus text row counter having a first modulus value corresponding to the number of the text rows displayed during conventional display, said text row counter being advanced in response to said output pulse from said scan line counter, said text row counter serving to control the vertical retrace of the electron beam of cathode ray tube; and means for changing the modulus of said text row counter to a second value providing a greater number of text rows on the display screen.

2. The apparatus of claim 1 wherein said scan line counter modulus changing means further includes means for changing the modulus of said scan line counter to a third value during the vertical retrace of the CRT beam as determined by said text row counter.

3. The apparatus of claim 2 wherein said text row counter modulus changing means includes a text row decoder responsive to a modulus selection signal and to a state of said text row counter, said text row decoder generating a signal for placing said scan line counter into said third modulus value during the vertical retrace of said CRT beam.

4. The apparatus of claim 1 wherein said scan line counter modulus changing means includes a scan line decoder responsive to the output of said scan line counter and to a modulus value selection signal, said scan line decoder serving to select a first modulus for said scan line counter in response to a first condition of said modulus value selection signal and to select a second modulus in response to a second value of said selection signal.

5. The apparatus of claim 4 wherein said text row counter modulus changing means includes a first decoder responsive to a selected output of said text row counter and to a modulus selection signal, said decoder selecting a first modulus for said text row counter in response to a first condition of said modulus selection signal and to a second count in response to a second condition of said modulus selection signal.

6. The apparatus of claim 5 wherein the state of said text row counter is decoded to generate a second control signal related to the occurrence of the vertical retrace of the CRT beam; said second control signal being fed to said scan line decoder and serving to change the value of the modulus of said scan line counter during the vertical retrace of the CRT beam.

* * * * *